US007703101B2

(12) United States Patent
Cuomo et al.

(10) Patent No.: US 7,703,101 B2
(45) Date of Patent: Apr. 20, 2010

(54) AUTONOMIC WORKLOAD CLASSIFICATION USING PREDICTIVE ASSERTION FOR WAIT QUEUE AND THREAD POOL SELECTION

(75) Inventors: Gennaro A. Cuomo, Cary, NC (US); Erik A. Daughtrey, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1833 days.

(21) Appl. No.: 10/778,584

(22) Filed: Feb. 13, 2004

(65) Prior Publication Data
US 2005/0183084 A1    Aug. 18, 2005

(51) Int. Cl.
G06F 9/46 (2006.01)
G06F 15/16 (2006.01)
G06F 15/173 (2006.01)
G06F 9/44 (2006.01)

(52) U.S. Cl. ............... 718/104; 718/102; 709/201; 709/203; 709/223; 709/226; 717/127; 717/131

(58) Field of Classification Search ......... 718/100–106; 709/201–203, 223–226; 717/127–131
See application file for complete search history.

(56) References Cited

U.S. PATENT DOCUMENTS

| | | | |
|---|---|---|---|
| 5,504,894 A * | 4/1996 | Ferguson et al. ........ 707/2 |
| 5,504,898 A | 4/1996 | Klein | |
| 5,594,904 A * | 1/1997 | Linnermark et al. ...... 717/124 |
| 5,664,106 A | 9/1997 | Caccavale | |
| 5,666,523 A | 9/1997 | D'Souza | |
| 5,675,739 A | 10/1997 | Eilert et al. | |
| 5,745,778 A | 4/1998 | Alfieri | |
| 5,752,031 A | 5/1998 | Cutler et al. | |
| 5,859,969 A | 1/1999 | Oki et al. | |
| 5,960,198 A | 9/1999 | Roediger et al. | |
| 6,016,466 A | 1/2000 | Guinther et al. | |
| 6,072,953 A | 6/2000 | Cohen et al. | |
| 6,085,217 A | 7/2000 | Ault et al. | |

(Continued)

FOREIGN PATENT DOCUMENTS

EP    07-25339 A2    8/1996

(Continued)

OTHER PUBLICATIONS

Barham et al., "Magpie: Real-Time Modelling and Performance-Aware Systems", USENIX, 2003, p. 1-7.*

(Continued)

*Primary Examiner*—Meng-Ai An
*Assistant Examiner*—Jennifer N To
(74) *Attorney, Agent, or Firm*—Marcia L. Doubet

(57) ABSTRACT

Incoming work units (e.g., requests) in a computing workload are analyzed and classified according to predicted execution. Preferred embodiments track which instrumented wait points are encountered by the executing work units, and this information is analyzed to dynamically and autonomically create one or more recognizers to programmatically recognize similar, subsequently-received work units. When a work unit is recognized, its execution behavior is then predicted. Execution resources are then allocated to the work units in view of these predictions. The recognizers may be autonomically evaluated or tuned, thereby adjusting to changing workload characteristics. The disclosed techniques may be used advantageously in application servers, message-processing software, and so forth.

27 Claims, 9 Drawing Sheets

400

| | Request (410) | Service ID (420) | Correlator (430) | Wait Points (440) | Parameter Information (450) |
|---|---|---|---|---|---|
| 401 | A | Svc_A | A1 | W1, W3, W5, W1 | p1=1, p2=2 |
| 402 | B | Svc_B | B2 | W2, W4 | p3="A", p4="B" |
| 403 | C | Svc_C | C3 | W1 | p5=987 |
| 404 | A | Svc_A | A4 | W1, W3, W5, W3 | p1=1, p2=102 |
| 405 | D | Svc_D | D5 | W2, W4 | p3="X", p4="Y" |
| 406 | B | Svc_B | B6 | W2 | p3="X", p4="B" |

U.S. PATENT DOCUMENTS

| | | | | |
|---|---|---|---|---|
| 6,086,618 | A * | 7/2000 | Al-Hilali et al. | 703/2 |
| 6,105,053 | A | 8/2000 | Kimmel et al. | |
| 6,182,109 | B1 | 1/2001 | Sharma et al. | |
| 6,192,389 | B1 | 2/2001 | Ault et al. | |
| 6,209,018 | B1 * | 3/2001 | Ben-Shachar et al. | 718/105 |
| 6,311,327 | B1 | 10/2001 | O'Brien et al. | |
| 6,317,786 | B1 * | 11/2001 | Yamane et al. | 709/224 |
| 6,324,683 | B1 * | 11/2001 | Fuh et al. | 717/124 |
| 6,327,700 | B1 * | 12/2001 | Chen et al. | 717/127 |
| 6,397,252 | B1 | 5/2002 | Sadiq | |
| 6,427,161 | B1 | 7/2002 | LiVecchi | |
| 6,477,561 | B1 | 11/2002 | Robsman | |
| 6,535,878 | B1 | 3/2003 | Guedalia et al. | |
| 6,542,920 | B1 | 4/2003 | Belkin et al. | |
| 6,629,142 | B1 | 9/2003 | Badami et al. | |
| 6,721,941 | B1 | 4/2004 | Morshed et al. | |
| 6,772,202 | B2 * | 8/2004 | Wright | 709/219 |
| 6,792,460 | B2 * | 9/2004 | Oulu et al. | 709/224 |
| 6,802,054 | B2 | 10/2004 | Faraj | |
| 6,816,882 | B1 | 11/2004 | Conner et al. | |
| 6,862,444 | B2 | 3/2005 | Karaoguz et al. | |
| 6,879,995 | B1 | 4/2005 | Chinta et al. | |
| 6,898,617 | B2 * | 5/2005 | Doolittle et al. | 709/201 |
| 7,051,330 | B1 * | 5/2006 | Kaler et al. | 718/106 |
| 7,080,378 | B1 | 7/2006 | Noland et al. | |
| 7,127,716 | B2 | 10/2006 | Jin et al. | |
| 7,143,396 | B2 * | 11/2006 | Suresh | 717/130 |
| 7,185,320 | B2 * | 2/2007 | Gouriou et al. | 717/130 |
| 7,207,043 | B2 * | 4/2007 | Blythe et al. | 718/104 |
| 7,210,127 | B1 * | 4/2007 | Rangachari | 717/128 |
| 7,237,242 | B2 * | 6/2007 | Blythe et al. | 718/105 |
| 7,240,101 | B2 * | 7/2007 | Rich et al. | 709/219 |
| 7,275,239 | B2 * | 9/2007 | Cuomo et al. | 717/130 |
| 7,349,340 | B2 * | 3/2008 | Sahai et al. | 370/235 |
| 7,379,999 | B1 * | 5/2008 | Zhou et al. | 709/224 |
| 7,395,537 | B1 * | 7/2008 | Brown et al. | 718/104 |
| 2001/0025275 | A1 | 9/2001 | Tanaka et al. | |
| 2002/0065816 | A1 | 5/2002 | Tsusaka et al. | |
| 2002/0128984 | A1 | 9/2002 | Mehta et al. | |
| 2002/0147693 | A1 | 10/2002 | Banerjee et al. | |
| 2002/0163664 | A1 * | 11/2002 | Sugano | 358/1.15 |
| 2002/0194251 | A1 | 12/2002 | Tsusaka et al. | |
| 2003/0009401 | A1 | 1/2003 | Ellis | |
| 2004/0024995 | A1 * | 2/2004 | Swaine | 712/227 |
| 2004/0078691 | A1 | 4/2004 | Cime et al. | |
| 2004/0103194 | A1 * | 5/2004 | Islam et al. | 709/225 |
| 2004/0215746 | A1 * | 10/2004 | McCanne et al. | 709/219 |
| 2004/0268315 | A1 * | 12/2004 | Gouriou et al. | 717/129 |
| 2005/0138111 | A1 * | 6/2005 | Aton et al. | 709/201 |
| 2005/0193113 | A1 * | 9/2005 | Kokusho et al. | 709/225 |

FOREIGN PATENT DOCUMENTS

| | | |
|---|---|---|
| JP | 07-152590 | 6/1995 |
| JP | 07-152700 | 6/1995 |

OTHER PUBLICATIONS

Barham et al., "Using Magpie for Request Extraction and Workload Modelling", USENIX, 2004, p. 1-32.*

Smith et al., "Using Run-Time Predictions to Estimate Queue Wait Times and Improve Scheduler Performnace", Springer-Verlag, 1999, p. 202-219.*

Jen-Yao Chung, et al. "Goal-oriented dynamic buffer pool management for data base systems", IEEE, Aug. 1995: 191-198.

Pyarali, Irfan, et al., Evaluating and Optimizing Thread Pool Strategies for Real Time CORBA, 2002.

Ling, Yibei, et al., Analysis of Optimal Thread Pool Size, Feb. 14, 2000, Publilsher: ACM Press.

Welsh, Matt, et al., SEDA: An Architecture for Well-Conditioned, Scalable Internet Services, 2001, Publisher: ACM.

Calcote, John, Thread Pools and Server Performance, Dr. Dobb's Journal, Jul. 1997, p. 60-64, retrieved Sep. 13, 2008 from http://www.ddj.com/web-development/184410233.

Chander, Ajay, et al., Mobile Code Security by Java Bytecode Instrumentation, IEEE, Jul. 2001: 27-40.

Havelund, Klaus, et al., Monitoring Java Programs with Java PathExplorer, Elsevier Science B.V., 2001 (all pages).

* cited by examiner

FIG. 4

| | Request | Service ID | Correlator | Wait Points | Parameter Information |
|---|---|---|---|---|---|
| 401 | A | Svc_A | A1 | W1, W3, W5, W1 | p1=1, p2=2 |
| 402 | B | Svc_B | B2 | W2, W4 | p3="A", p4="B" |
| 403 | C | Svc_C | C3 | W1 | p5=987 |
| 404 | A | Svc_A | A4 | W1, W3, W5, W3 | p1=1, p2=102 |
| 405 | D | Svc_D | D5 | W2, W4 | p3="X", p4="Y" |
| 406 | B | Svc_B | B6 | W2 | p3="X", p4="B" |

610 WPS1 : → W1 → W3 → W5
620 WPS2 : → W2 → W4
630 WPS3 : → W1
640 WPS4 : → W2

FIG. 7
700

710 WPS1 : → A1 → A4
720 WPS2 : → B2 → D5
730 WPS3 : → C3
740 WPS4 : → B6

FIG. 8
800

810 Svc_A : → A1 → A4
820 Svc_B : → B2 → B6
830 Svc_C : → C3
840 Svc_D : → D5

FIG. 9
900

910 Svc_A : → p1=1, p2=2 → p1=1, p2=102
920 Svc_B : → p3="A", p4="B" → p3="X", p4="B"
930 Svc_C : → p5=987
940 Svc_D : → p3="X", p4="Y"

AUTONOMIC WORKLOAD CLASSIFICATION USING PREDICTIVE ASSERTION FOR WAIT QUEUE AND THREAD POOL SELECTION

BACKGROUND OF THE INVENTION

Related Inventions

The present invention is related to inventions disclosed in the following commonly-assigned and co-pending U.S. Patents, which are hereby incorporated herein by reference (and which are referred to hereinafter as "the related inventions"): U.S. Pat. No. 7,237,242 (Ser. No. 10/334,768, filed Dec. 31, 2002), which is entitled "Dynamic Thread Pool Tuning Techniques"; U.S. Pat. No. 7,207,043 (Ser. No. 10/334,262, filed Dec. 31, 2002), which is entitled "Programmatic Response-Time Based Workload Distribution Techniques"; and U.S. Pat. No. 7,275,239 (Ser. No. 10/361,325, filed Feb. 10, 2003), which is entitled "Run-Time Wait Tracing using Byte Code Insertion".

FIELD OF THE INVENTION

The present invention relates to computers, and deals more particularly with predicting how incoming requests at a server will use system resources and then using these predictions to allocate execution resources (e.g., to balance server workload in a multithreaded server environment). More particularly, the disclosed techniques predict where requests will wait for resources, and preferably use these predictions to select an appropriate run-time queue (also referred to herein as a "wait queue") for each request, where this run-time queue vectors (i.e., directs) requests to a thread pool, from which a thread will be assigned to the request for execution.

DESCRIPTION OF THE RELATED ART

The popularity of network computing has increased tremendously in recent years, due in large part to growing business and consumer use of the public Internet and the subset thereof known as the "World Wide Web" (or simply "Web"). Other types of network computing environments, such as corporate intranets and extranets, are also increasingly popular. As solutions providers focus on delivering improved Web-based computing, many of the solutions which are developed are adaptable to other network computing environments and/or other scenarios. Thus, references herein to the Internet and Web are for purposes of illustration and not of limitation. (Furthermore, the terms "Internet", "Web", and "World Wide Web" are used interchangeably herein.)

Servers in which applications are hosted, commonly referred to as "application servers", provide run-time services to one or more applications, and these applications may service requests for a large number of concurrent requesters (where the requesters may include other programs and/or human users). The performance requirements placed on these application servers by the deploying enterprise and/or its end users are typically quite demanding, and as the applications and deployment scenarios become increasingly complex, these performance requirements tend to increase as well. When a human user is interacting with a software application over the Internet and is requesting content, delays or inefficiencies in returning responses may have a very negative impact on user satisfaction, even causing the users to switch to alternative content providers. In some cases, service level agreements, or "SLAs", may be in place, placing contractual stipulations on factors such as maximum allowable response time. Delivering requested content quickly and efficiently is therefore critical, and accordingly, it is important to ensure that the systems on the server side of the network perform as efficiently as possible.

Typically, application servers use a multithreaded architecture wherein a number of threads execute concurrently, thereby enabling multiple client requests to be serviced concurrently. The set of threads that have been created but not destroyed will be referred to herein as a "thread pool" (or simply "pool"), and the number of such threads is referred to herein as the "thread pool size" (or simply "pool size").

Experience has shown that multithreaded servers experience thrashing when too many threads contend for constrained resources. For example, an application may need to connect to a database to retrieve or store data as it services requests. The number of available connections to a database is often restricted to a configured maximum (because there may be a maximum number of database connections that can be open at one time). If the number of threads is not limited in an environment where many threads are concurrently executing the application and attempting to connect to the database, the pool may become "clogged" with requests attempting to access the database. In a Web-centric environment, the incoming requests to an application server may be very homogeneous, such that many requests attempt to exercise the same or similar execution paths. Thus, many threads may block, waiting for one of the limited number of database connections to become available. Increasing the number of threads in this situation only leads to more blockages, which is an inefficient use of resources. Furthermore, when too many threads are created, the system overhead for managing the threads may be unacceptably high, and too much memory may be required for storing system state and other information for these threads. Accordingly, it is usually necessary to constrain the size of thread pools to prevent this type of thrashing.

The present invention provides techniques that improve operations in a multithreaded server environment.

SUMMARY OF THE INVENTION

An object of the present invention is to improve performance in network computing environments.

Another object of the present invention is to improve performance of multithreaded servers.

A further object of the present invention is to provide improved techniques for scheduling requests to threads which are logically assigned to thread pools.

Still another object of the present invention is to define techniques for dynamically balancing a workload in a multithreaded server environment.

Yet another object of the present invention is to define techniques for programmatically distributing workload across a set of execution resources.

Another object of the present invention is to define techniques whereby a unit of work's parameter information can be used when selecting a wait queue and/or thread pool for handling that unit of work.

A further object of the present invention is to define techniques whereby a unit of work's execution context can be used when selecting a wait queue and/or thread pool for handling that unit of work.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and/or computer program products. In one aspect, the present invention provides techniques for programmatically analyzing execution behavior of work units. This aspect preferably comprises: recording, for each of a plurality of executing work units, information regarding one or more instrumented wait points encountered by the work unit; grouping the recorded information for the encountered work units; and programmatically determining characteristics of those work units that encountered the wait points in the groups. The work units may be, for example, execution requests, content requests, Web services requests, or requests that specify method/class names to be executed.

The recorded information preferably comprises at least an identifier of each wait point, and may further comprise time spent waiting at each wait point. The characteristics may comprise parameter names and values thereof.

Grouping the recorded information preferably further comprises: determining, from the recorded information, a set of the wait points encountered by each of the work units; and determining all unique ones of the determined sets. In this case, programmatically determining the characteristics preferably further comprises evaluating occurrence of the characteristics among the unique sets. Or, programmatically determining the characteristics may further comprise determining which of the characteristics are discriminators as to the wait points that are encountered.

The programmatically-determined characteristics may be used to programmatically build one or more recognizers which are adapted to recognizing those characteristics in arriving work units that are to be subsequently executed.

The analysis is preferably used to autonomically classify workload using predictive assertions. In another aspect, the assertions are used to assign work units to execution resources, such as threads or thread pools.

The present invention may also be provided as methods of doing business. For example, a service may be offered to customers whereby operational characteristics of the workload at one or more application servers are monitored, and these observations are used to make predictions about subsequent behavior in the application server(s). Preferably, the observations are directed toward analyzing the interactions between wait points encountered by units of work and the parameter information and/or other execution context of those units of work. This service may be provided under various revenue models, such as pay-per-use billing, monthly or other periodic billing, and so forth.

The present invention will now be described with reference to the following drawings, in which like reference numbers denote the same element throughout.

BRIEF DESCRIPTION OF THE DRAWINGS

FIGS. 4-9 provide sample data used to illustrate operation of the logic in FIG. 3.

DESCRIPTION OF PREFERRED EMBODIMENTS

Figure 1:
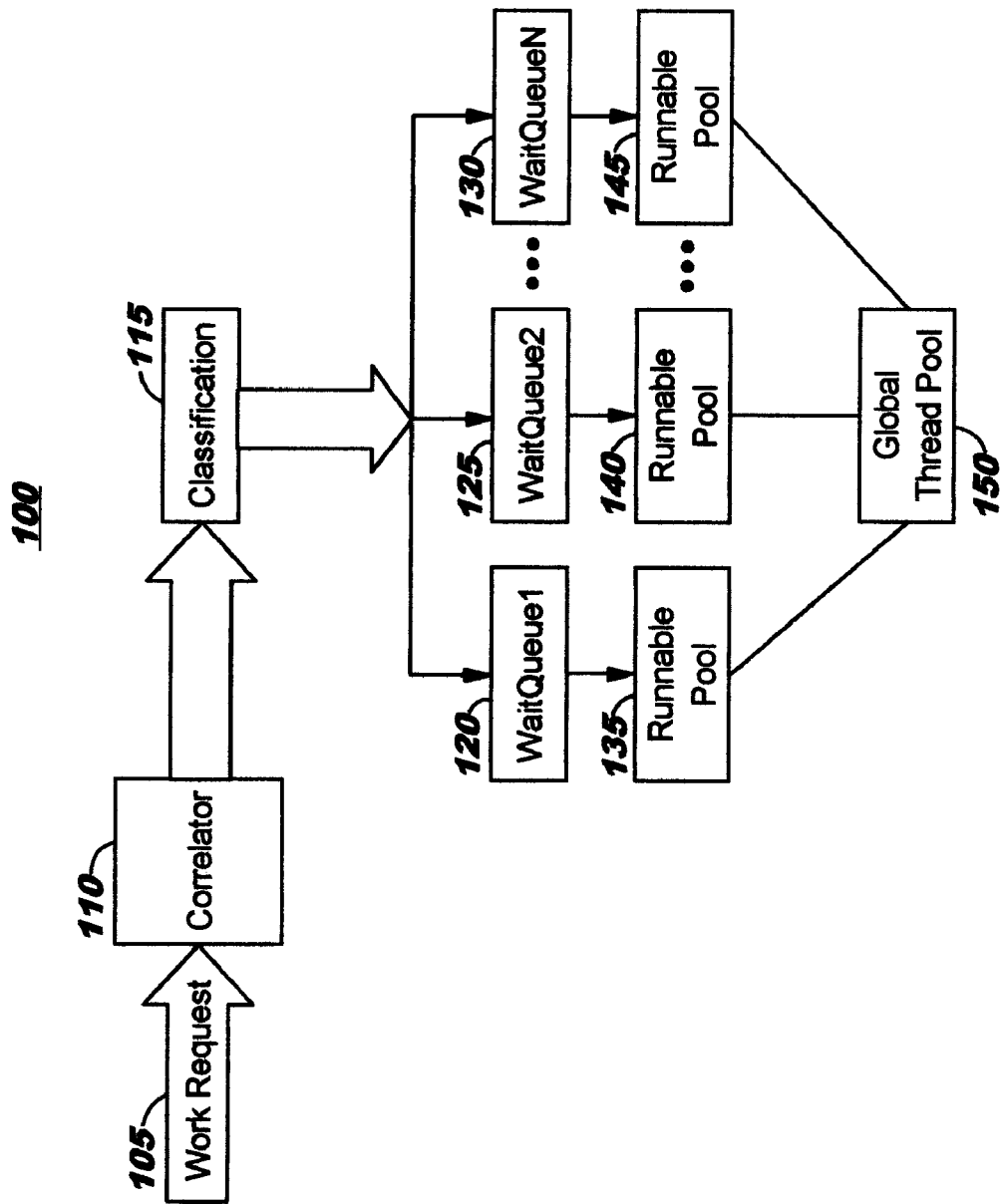
FIG. 1 depicts an abstract view of a system operating according to the present invention.

The present invention provides improvements for multithreaded servers. Techniques disclosed herein allow requests with less inter-thread contention to run more freely, while enabling those which contend for resources to be programmatically constrained. As a result, thrashing due to inter-thread contention for constrained resources may be reduced. The low-overhead approach of preferred embodiments is designed to efficiently balance throughput across a variety of work unit types in a dynamically-changeable workload which may have heterogeneous characteristics (that is, a workload where a number of different work unit types are serviced and/or where work units experience different computational paths).

The work units in a system may vary, and may include various types of requests for work. The term "request" is used herein to refer to these various work units.

It is known in the art to use multiple thread pools for servicing requests in a multithreaded server. Techniques disclosed in the related inventions address problems associated with using a single thread pool, and provide improvements using a plurality of pools. These techniques will now be described briefly; reference may be made to the related inventions for more details. (The related inventions also describe several of the problems related to use of single thread pools. Reference may be made to the related inventions for that discussion as well.)

The related invention titled "Dynamic Thread Pool Tuning Techniques", U.S. Pat. No. 7,237,242 (Ser. No. 10/334,768), discloses techniques for dynamically adjusting the number of thread pools, and/or the number of threads in pools, and then monitoring the system to determine whether the effect was positive or negative. This tuning is performed iteratively, thereby autonomously adapting to dynamic workload characteristics. This related invention is referred to hereinafter as "the Dynamic Thread Pool Tuning invention".

The related invention titled "Programmatic Response-Time Based Workload Distribution Techniques", U.S. Pat. No. 7,207,043 (Ser. No. 10/334,262), discloses techniques with which inbound requests may be assigned to a particular thread pool. As discussed in this related invention, each thread pool typically has a wait queue associated therewith, and requests often wait in these wait queues before being assigned to a thread. (For purposes of discussion herein, references to assigning a request to a thread pool are intended to be synonymous with assigning the request to a thread pool's wait queue and vice versa.) In preferred embodiments of this related invention, historical statistics are compiled regarding elapsed execution time and time spent waiting to execute, for individual types of requests. According to this related invention, which is referred to herein as "the Workload Distribution invention", the request type of a newly-arriving request—which needs to be assigned to a thread pool—is used to determine whether historical statistics are available to use in making the thread pool assignment for this request. If statistics are available, the average (historical) execution time for requests of this type is used to determine which of the plurality of thread pools is currently servicing requests that have similar execution time requirements and similar wait times, and the newly-arriving request is then vectored to that thread pool. (If no historical statistics are available, then the newly-arriving request may be vectored to a default pool.) In this manner, each thread pool services requests which are expected, based on their request type, to have relatively similar execution time and wait time.

The Workload Distribution invention also teaches that, in alternative embodiments, requests may be classified based on other identifying characteristics, such as request type plus request parameters (which may include parameter names and/or values). That is, the historical statistics may be gathered for, and associated with, identifying information other than just request type. In these alternative embodiments, the corresponding information from a newly-arriving request is used when searching for historical statistics to use when assigning the request to a thread pool. Examples discussed therein include further qualifying request types by using input values of their parameters (and, optionally, the parameter names) to index the classification data (which is also preferably recorded at this more-granular level); using the Uniform Resource Identifier ("URI") portion of a Uniform Resource Locator ("URL"), and optionally using parameter names/values with the URI; and in environments which do not rely on a "request type" categorization (such as non-Web environments), other information such as method names (including their class or deployed name) may be used in place of request types. This related invention also states that this latter approach may be useful, for example, in an Enterprise JavaBeans® environment, and that parameter names/values may be used with method names, if desired, as further qualifiers. ("Enterprise JavaBeans" is a registered trademark of Sun Microsystems, Inc. in the United States, other countries, or both.)

While the Dynamic Thread Pool Tuning invention and the Workload Distribution invention provide a number of advantages, they do not discuss, and the techniques disclosed therein do not exploit, the possibility that multiple thread pools might handle more concurrently-executing requests if threads were allocated according to a workload's contention and resource utilization model. The present invention is directed toward this workload contention approach to resource allocation.

Preferred embodiments of the present invention employ a set of "logical" thread pools for servicing requests. That is, a single physical or "global" thread pool is preferably used (e.g., to improve operating efficiency), where the threads within that global thread pool are logically partitioned into smaller sets. Each set of threads thus partitioned comprises a logical thread pool. (Preferred embodiments of the Dynamic Thread Pool Tuning invention and the Workload Distribution invention also use multiple logical thread pools. Accordingly, when dynamically tuning pools according to the Dynamic Thread Pool Tuning invention, the tuning may comprise re-allocating threads from the global thread pool among the logical pools, rather than actually creating new threads for a pool or destroying existing threads, thereby incurring significantly less overhead.)

Whereas the Workload Distribution invention teaches distributing requests to thread pools according to historical execution time requirements and wait times, as observed for requests of a particular request type (and/or other criteria, as discussed above), the present invention generates predictive wait information that may be used when selecting a thread pool. That is, preferred embodiments of the present invention determine which requests may be related, using a classification that is based on their perceived contention for resources. This classification is used as a predictor of potential resource utilization and inter-thread contention for those resources, thereby allowing the predictive allocation of execution resources. The execution resources of particular interest are threads. Accordingly, preferred embodiments use the predictive information when vectoring requests to a thread pool.

Preferred embodiments estimate which threads will be contending for similar resources by determining where particular requests wait. The related invention titled "Run-Time Wait Tracing using Byte Code Insertion", U.S. Pat. No. 7,275,239 (Ser. No. 10/361,325) discloses techniques for locating expected wait points in code and dynamically instrumenting the code so that tracing can be activated when the code is executed. Using techniques disclosed in this related invention, which is referred to hereinafter as "the Byte Code Insertion invention", run-time information can be gathered for subsequent analysis, including an identification of the wait points actually encountered, the code path leading up to those wait points, and the time spent waiting.

Preferred embodiments of the present invention predict where requests will wait on resources by maintaining a history of which requests hit specific instrumented wait points. Techniques disclosed in the Byte Code Insertion invention are preferably leveraged for instrumenting wait points. Techniques disclosed in the Byte Code Insertion invention may also be used for recording information about the wait points where requests wait. (Refer to the discussion of FIG. 2, below, for a discussion of information to be recorded, according to preferred embodiments of the present invention, when an executing request hits an instrumented wait point.) In alternative embodiments, wait points may be instrumented in other ways, including manual modification of code.

In order to use execution history from previously-executed requests for predicting information about the wait patterns of subsequently-received requests, preferred embodiments of the present invention classify the history and use this classification to find a subset of the previously-executed requests that is sufficiently similar to a particular subsequently-received request as to be a good predictor of that request's wait pattern. Preferably, parameter information is recorded for requests that wait, and embodiments of the present invention attempt to discern which parameter values are important in driving requests to specific wait points. Preferred embodiments of the classification techniques perform evaluations across both wait point sets and request types, as discussed in more detail herein, using intersection techniques for parameter sets. (The term "wait point set" is used herein to refer to a related collection of wait points, as described in more detail below.) Both differences and unions are preferably used, attempting to determine which parameter values tend to occur in requests that hit particular wait point sets. In this manner, embodiments of the present invention programmatically analyze which parameter values appear to be significant in determining whether a request waits (and where it waits).

Once predictive information about wait points has been derived, it may be used to determine which thread pool a request should be vectored to. This predictive information may also, or alternatively, be used in other ways, such as determining whether a particular request should be immediately made available for execution (or for scheduling to a thread) or should instead be held temporarily. For example, there may be a limited number of connections available to a database, as discussed earlier. If it is predicted that a particular request will need database access, but there is currently contention for the database connections, then it may be desirable to hold this request temporarily, until the contention for database connections lessens. On the other hand, if it is predicted that another request will not need to access the database, then the current database connection contention is not a reason to hold this other request.

In some implementations, the granularity of information available for use with the classification techniques disclosed herein may vary, and this granularity may impact the success of the predictions. For example, rather than simply recording that a thread is waiting on database access, it may be useful to know more details about parameters of that request, such as whether the access was requesting an update of a record or a deletion of a record (and perhaps one or more values to be used in the update, or one or more values from the record to be deleted, might also prove useful). Furthermore, it may be useful to known which table(s) in the database the request is attempting to access. Accordingly, while preferred embodiments are described herein with reference to using a certain level of detail, this is by way of illustration and not of limitation.

As discussed above, thread pools must be constrained for optimal performance, and use of a single thread pool is inefficient for handling various workloads which are potentially contending for some of the same resources. Accordingly, preferred embodiments direct work to multiple wait queues, where each wait queue controls entry into an associated thread pool. As work requests (e.g., inbound client requests) enter the server, a classification mechanism is used to determine which wait queue should handle the work. This classification mechanism attempts to locate historical information which can be used as a predictor for this newly-arriving work request. The work is then placed on an appropriate wait queue. If there is not enough historical information to properly handle the request, then the work request might be placed onto a default wait queue.

Referring now to FIG. 1, an abstract view of a system 100 operating as disclosed herein is illustrated. As work requests 105 enter the system, a unique correlator 110 is created for each such request, according to preferred embodiments. The correlator is used, as the request flows through the system, when gathering and recording information pertaining to the request and its current processing. This correlator may also be referred to as a "classification key", in that it identifies a set of related information that forms the execution history for a particular request and can be used to subsequently retrieve that execution history when creating "recognizers" that are used to classify subsequently-arriving inbound requests. The classification operation is illustrated at reference number 115 of FIG. 1. The classification determines which thread pool this request should be assigned to. (The manner in which the recognizers are created, and operate, is described in more detail, below.)

As has been stated, a request must typically enter a wait queue, waiting for a thread to become available. Thus, the requests are shown in FIG. 1 as being directed to one of "N" wait queues 120, 125, 130, where each wait queue corresponds to one of the N logical thread pools 135, 140, 145 currently being used in system 100. FIG. 1 shows the inbound requests traversing from a wait queue to a "runnable pool" 135, 140, 145. These runnable pools correspond to the logical thread pools which have been discussed herein, and as FIG. 1 illustrates, the threads in these logical pools are actually defined in a global thread pool 150. In preferred embodiments, the runnable pools contain some limited number of executable wrapper objects (when implementing the present invention in an object-oriented language), where each wrapper object represents one of the threads assigned to the logical thread pool. (The executable wrapper object also provides an interface mechanism for the thread.) Accordingly, as with the number of threads, the number of executable wrapper objects may vary from one pool 135, 140, 145 to another. Thus, an inbound request remains in a wait queue until one of the executable wrapper objects in the runnable pool associated with that wait queue is available. (Availability of the executable wrapper object implies, by definition, that a thread is available.) In this manner, the executable wrapper objects provide an efficient and reliable way to enforce a limit on the number of threads per pool, yet still use a single global thread pool where the threads are actually defined. (Using a single global thread pool results in significantly less overhead than maintaining separate physical thread pools. Refer to the Dynamic Thread Pool Tuning and Workload Distribution inventions, where this is discussed, for more details.)

The size of the various thread pools 135, 140, 145 may differ, depending on how much work of the type being directed to that pool should run concurrently. Each request spends some amount of time executing, and upon completion of its execution, the request's thread is returned to its runnable pool (i.e., by returning or freeing up the executable wrapper object). The request's results are then returned to the requester, using prior art techniques (not shown in FIG. 1).

The Workload Distribution invention discusses use of request type as an index when classifying requests, and states that additional or different information may be used, alternatively, as an index to locate applicable historical statistics during a classification operation (as has been discussed above). The present invention expands on this notion, providing automated techniques for analyzing parameter values during a classification operation. In addition to URIs/URLs and method names, as discussed above, embodiments of the present invention may be used in environments such as Web services, in which case a Web service name may be used in place of a request type. As in the related invention, references made herein to "request types" are therefore by way of illustration, but not of limitation. (It should be noted that, optionally, techniques disclosed herein may be used in combination with techniques disclosed in either or both of the Workload Distribution and Dynamic Thread Pool Tuning inventions.)

The manner in which preferred embodiments of the present invention use predictive assertions to classify work requests and then route those requests to wait queues will now be described in more detail with reference to FIGS. 2-13.

Figure 2:
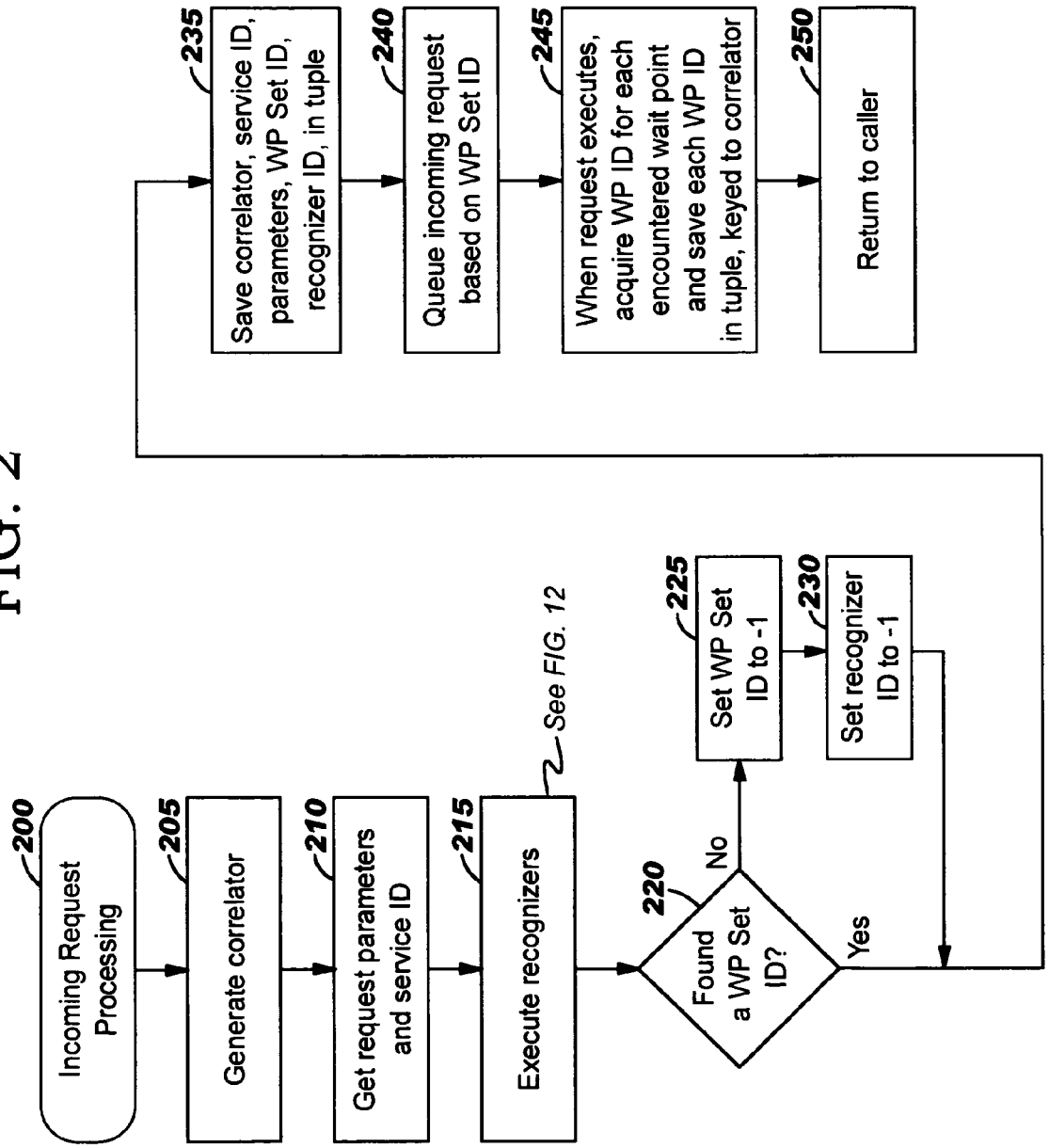
FIGS. 2, 3, 10, and 12-13 provide flowcharts illustrating logic that may be used when implementing preferred embodiments of the present invention.

FIG. 2 provides a flowchart depicting the processing of an incoming request, and begins (Block 200) when the request is received. A correlator is generated (Block 205), and in preferred embodiments, this correlator is a unique number (or other unique identifier) that can be used for correlating information that pertains to this specific incoming request. In Block 210, the parameter information for this request is obtained, along with a service identifier ("ID") for this request. Preferably, the parameter information comprises all of the parameter names used on this request, and their corresponding values. (In alternative embodiments, it may be desirable to use a subset of this information.)

The service ID, in preferred embodiments, comprises a highest-level differentiator that serves to identify what will be executed for this request. For example, in a Web environment, the service ID may be the URL or URI from which the incoming request is requesting content. In an Enterprise JavaBeans environment, the service ID may be the name of an EJB or a method. As another example, in a Web services environment, the service ID might be the name of an invoked Web service. It may be necessary, in some environments, to include protocol information in the service ID values, in order to create a sufficiently-unique identifier. As an example, if a system under analysis includes Hypertext Transfer Protocol ("HTTP") requests as well as Web services requests, it may be necessary to prefix the service IDs for the HTTP requests with "http://" and those for the Web services requests with "SOAP:", in case a requested URL has the same name as a requested Web service.

Figure 12:
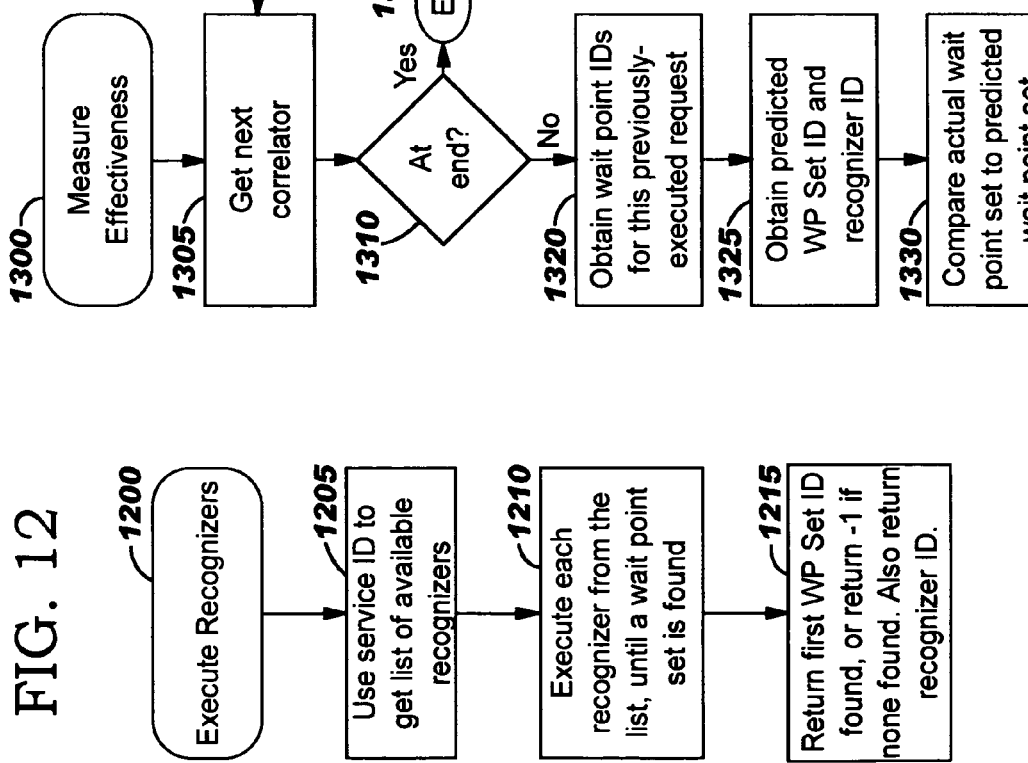

Block 215 executes the recognizers created according to preferred embodiments to classify incoming requests. Refer to FIG. 12, which depicts a preferred embodiment of this operation in more detail. Block 220 then checks to see if executing the recognizers resulted in finding a wait point set ID ("WP Set ID") for this request. Wait points, as stated earlier, are instrumented locations where requests may potentially wait. During execution, preferred embodiments track which of those potential wait points are actually encountered for particular requests. This is called the "wait point set" for that request. That is, a wait point set is a set of wait points that have been reached during execution of a particular request. It may also happen that more than one request waits at the same wait points, and in this case, the wait point set represents the wait points reached during execution of those requests.

Preferred embodiments associate parameter information with the gathered wait point sets, and then analyze that parameter information in an attempt to deduce which parts thereof are non-differentiators (also referred to herein as "non-discriminators"). For example, if more than one request of request type "A" has a value of "x" for some parameter "B", yet those requests do not all have the same wait point sets, then it may be presumed that this parameter/value pair is not a suitable differentiator for predicting the behavior of similar, subsequently-executed requests. In preferred embodiments, the analysis of parameter information also determines which parts thereof are (apparently) differentiators (also referred to herein as "discriminators"), and this result is associated with the wait point sets it represents. (The manner in which this analysis of parameter information is performed, according to preferred embodiments, is discussed below with reference to FIG. 3.)

Thus, if Block 215 results in finding a WP Set ID, this is an indication that, according to the predictive assertions of the present invention, the parameter information for this incoming request suggests that this request will wait at wait points in that set (i.e., the same wait points as one or more previously-executed requests).

Otherwise, when the test in Block 220 has a negative result, then execution of the recognizers did not find a WP set ID. This may be because the parameter information of this incoming request is different from the differentiators associated with the known wait point sets. Or, it may be because there are no recognizers, for example at system start-up. (Preferred embodiments create recognizers dynamically and autonomically, to recognize the wait point sets that are encountered at run time, as will be discussed in more detail below.) Block 225 sets the WP set ID to −1 (i.e., negative one) or a similar value that serves as an indicator that no WP set ID has been located. Block 230 similarly sets a recognizer ID value to −1, indicating that a matching recognizer was not found.

At Block 235, a tuple is created and persisted that, in preferred embodiments, contains the correlator associated with the current incoming request, the parameter information for this request, the service ID, the WP set ID, and the recognizer ID. This information will be used subsequently, after the request has executed, when autonomically tuning the recognizers based on how effectively the recognizers predict where requests will wait. (This autonomic tuning operation is discussed below, with reference to FIG. 13.)

The incoming request is then queued, based on the predictive assertion (Block 240). If the WP set ID is −1, then preferred embodiments queue the request to a default queue. Otherwise, the WP set ID is used to select an appropriate wait queue for the request. For example, a lookup table may be programmatically consulted, using the WP set ID as a lookup key, to retrieve a wait queue identifier. Since the WP set ID is a predictor of instrumented wait points that are expected to be encountered by this request, the thread pool assignment preferably considers which thread pools are currently servicing other requests that are also expected to hit these wait points and/or to access resources associated with these wait points.

Preferred embodiments allocate resources to thread pools so that the workload is balanced in terms of contention for resources. For example, if it is known that the requests associated with a certain wait point set tend to wait for access to a database, then it may be advisable to vector all of these requests to a certain thread pool, where the number of threads in that thread pool is constrained to some size "n" which is the maximum number of concurrently-available connections to the database (or, alternatively, an optimal-but-less-than-maximum number). In this case, limiting the thread pool size and vectoring these requests to that thread pool is analogous to controlling how many threads try to access the database concurrently. (Since these requests are predicted to be contending for a limited resource, namely a database connection, allocating them in a manner that does not constrain how many can execute concurrently would be, in the general case, an inefficient allocation of threads. That is, allowing a larger number of available threads to be allocated for these requests would typically mean that a larger number of threads will become blocked.)

As will be obvious, while examples presented herein are described primarily with reference to requests that wait for database access, there may be many other scenarios where requests wait and for which the novel techniques disclosed herein can be used advantageously. As another example, suppose that requests are received that post forms to a specific URL, and that some of these forms provide information to be posted to a relational database while other ones of these forms provide information to be posted to a directory database. Requests accessing the relational database will not normally cause contention with the requests accessing the directory database, and an implementation of the present invention may therefore use this knowledge when vectoring requests for this specific URL among the thread pools.

Returning to the discussion of FIG. 2, Block 245 indicates that, when this queued request executes, information will be gathered for each instrumented wait point it encounters. Preferably, this gathered information comprises a tuple containing a wait point ID ("WP ID") that uniquely identifies the encountered wait point, along with the correlator that uniquely identifies this request (where, as stated earlier, this correlator can be used as a key to correlate the execution information gathered for the request). The entry and exit times for each wait point may also be stored in these tuples (or, equivalently, the time spent waiting at each wait point may be recorded in each tuple).

In one aspect of preferred embodiments, an instrumented wait point may be instrumented to identify itself using a particular unique WP ID (which may be statically assigned). In alternative aspects, wait points might be further differentiated using parameter information, such that a particular wait point might be identified using one unique WP ID when it is encountered with a first set of parameter information, but might be identified using a different unique WP ID when it is encountered with a different set of parameter information. Thus, for example, if an instrumented wait point is created in code that makes (or perhaps reuses) a database connection, an identifier such as "1A2B3C..." might identify that wait point in some aspects. Alternatively, a distinction might be made as to whether the request attempting to access the database connection intends to update data or to retrieve data, and different WP IDs might be assigned for each case. Even further granularity might be deemed useful, such as using one WP ID to identify the wait point if a request is attempting to retrieve data from a certain table in the database, and using a different WP ID for that same wait point if the request is attempting to retrieve data from some other table in the database.

When the request finishes execution, the tuples created according to Block 245 describe all of the wait points that have been encountered for this request. Control then returns from FIG. 2 to the caller (Block 250).

Figure 3:
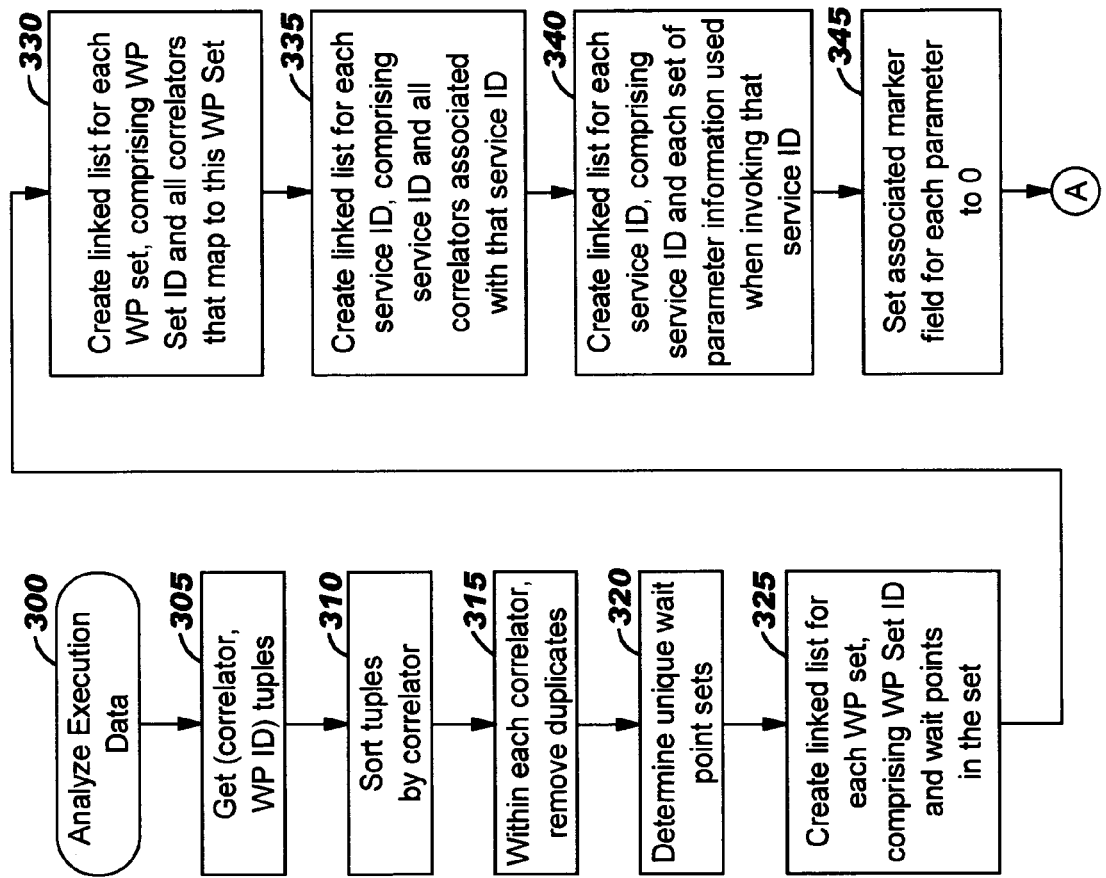
Figure 3:
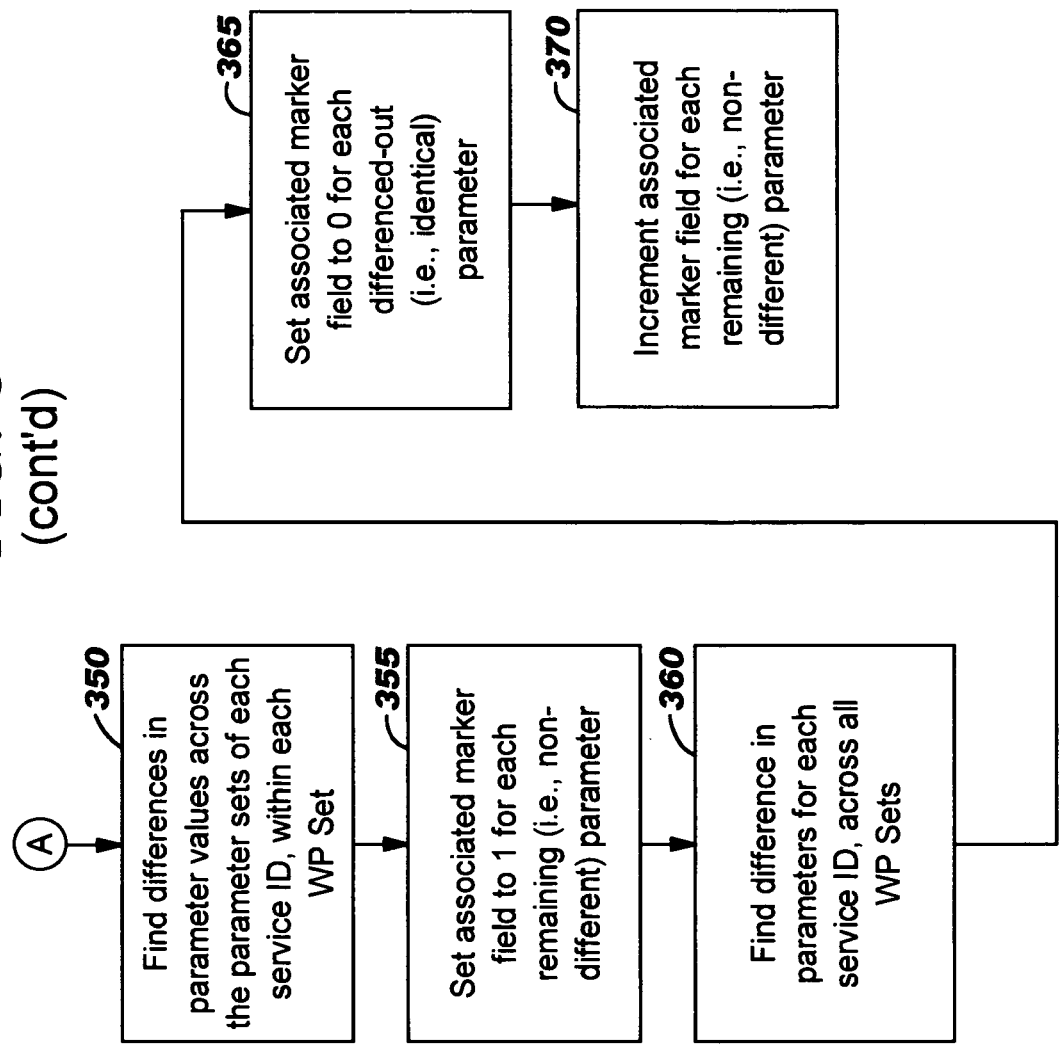

Referring now to FIG. 3, a flowchart is provided that depicts how preferred embodiments analyze the execution data gathered according to the approach discussed with reference to Block 235 of FIG. 2. Sample data is provided in FIG. 4, and is used to illustrate processing of this analysis. The dynamically-constructed recognizers operate more efficiently if they are built to check only for the parameter information deemed to be significant with regard to encountering wait points, also referred to herein as the "discriminators", and the analysis depicted in FIG. 3 is therefore directed toward programmatically determining the proper parameter information to use in these recognizers.

This analysis operation, which begins at Block 300, may be invoked in various manners. For example, a timer-driven approach may be used, whereby this analysis is repeated at specific intervals (which may be configurable). Or, an event-driven approach may be used. Furthermore, while the processing of FIG. 3 is described in terms of analyzing all currently-available execution data, this is by way of illustration and not of limitation. Alternatively, a subset of the available data may be processed, and that subset may be selected in various ways. As one example, it may be desirable to focus the analysis on selected request types (or, analogously, selected service IDs), such that the operational behavior of those selected request types can be autonomically tuned. As another example, the subset may be selected randomly or pseudo-randomly (for example, by determining the number of correlators for which data was accumulated, and analyzing the data corresponding to some portion of these correlators).

Preferred embodiments discard the execution data after it has been analyzed by the processing of FIG. 3. In this manner, each iteration through FIG. 3 uses execution data that represents a recent snapshot of the current workload. Alternatively, it may be desirable in some environments to reuse execution data, for example by using a "sliding window" approach whereby some number of previous snapshots are retained (at least temporarily) for reuse.

The analysis process proceeds (at Block 305) by obtaining the saved tuples that contain (correlator, WP ID) information, thereby identifying where a request waited. (Note that these tuples are distinct from the tuples that include the correlator ID, service ID, parameter information, WP set ID, and recognizer ID. The tuples of interest in Block 305 are those created at Block 245 of FIG. 2.) Block 310 sorts these tuples by correlator, and in preferred embodiments, Block 315 then removes any duplicates within a correlator. (That is, a particular request may have waited more than once at any given wait point, such that there will be more than one tuple that identifies this wait point and that uses this request's correlator. Preferred embodiments factor out these duplicated wait point IDs.)

Suppose, for example, that the sample data represented in table 400 of FIG. 4 represents recent processing in a system embodying the present invention. (As will be obvious, an actual system will typically generate much more data than shown in this sample. Furthermore, this tabular representation is for purposes of discussion only: preferred embodiments create data structures having different formats. For example, four separate tuples are generated in preferred embodiments to represent the four wait points shown in column 440 of row 401 of table 400.) For ease of illustration, requests are identified in this sample data using single-letter identifiers; service IDs are comprised of a string containing this request identifier; correlators use a simple two-character value; wait points are identified as "Wn", where "n" is a single digit; and parameters are identified as "Py", where "y" is a single digit. See columns 410-450. This sample data also illustrates repeated execution of a request having the same service ID, as shown in rows 401 and 404 and again in rows 402 and 406. Notably, the data gathered for these repeated executions of a request type is distinguished by the unique correlator created for each execution (in Block 205 of FIG. 2).

Referring now to the wait point IDs shown in row 401 of table 400, this sample indicates that the first execution of request "A" (having correlator "A1") reached instrumented wait points four times, where three of these wait points are unique. Similarly, row 404 shows that the second execution of request "A" (having correlator "A4") reached four wait points, three of which are unique. The processing of Block 305 therefore obtains the four tuples illustrated in columns 430 and 440 of these rows, along with the tuples illustrated for rows 402, 403, 405, and 406. After the processing of Block 315, the sorted wait point IDs "W1, W1, W3, W5" and "W1, W3, W3, W5" for rows 401 and 404, respectively, are compressed to "W1, W3, W5".

Block 320 then determines the unique wait point sets, using the information resulting from Block 315. FIG. 5 illustrates a collection 500 of the unique wait point sets that corresponds to the sample analysis data in table 400 of FIG. 4. As shown in FIG. 5, a wait point set 510 comprises wait point IDs W1, W3, W5. This wait point set 510 identifies the unique wait points encountered by the requests in rows 401 and 404 of table 400. The wait point set 520, comprising wait point IDs W2 and W4, identifies the unique wait points encountered by the requests in rows 402 and 405. Wait point set 530, comprising a single wait point ID W1, identifies the wait point encountered by the request in row 403, and wait point set 540, comprising a single wait point ID W2, identifies the wait point encountered by the request in row 406.

In Block 325, a linked list (or similar structure) is created for each of the unique wait point sets from Block 320. (References herein to use of linked lists are by way of illustration and not of limitation.) In preferred embodiments, a unique wait point set ID is associated with each of these linked lists. FIG. 6 illustrates a representation 600 for the sample data, wherein WP set IDs are created by appending a digit to a prefix "WPS". In this representation 600, arrows are used to show the linkage among the wait points IDs in each wait point set, and rows 610-640 correspond to the wait point sets 510-540 of FIG. 5.

Block 330 then creates another linked list for each wait point set, where these linked lists identify all of the correlators that map to the corresponding wait point set. A representation 700 in FIG. 7 shows a result of the processing of Block 330 when using the sample data in FIG. 4. As shown therein, linked list 710 indicates that the wait points contained in the wait point set having WP set ID "WPS1" (see row 610 of FIG. 6) were all reached, during execution, by the requests having correlators "A1" and "A4". Similarly, linked list 720 indicates that the wait points in wait point set "WPS2" were reached by the requests having correlators "B2" and "D5"; linked list 730 indicates that the wait point in wait point set "WPS3" was reached by the request having correlator "C3"; and linked list 740 indicates that the wait point in wait point set "WPS4" was reached by the request having correlator "B6".

Block 335 then creates a linked list for each unique service ID, where the linked list contains an element for each correlator associated with that service ID. A representation 800 is shown in FIG. 8 to illustrate the linked lists for the sample data 400. As shown therein, linked list 810 represents the service ID "Svc_A", indicating that two different requests having this service ID were executed, where those requests had correlators "A1" and "A4". (Refer to rows 401 and 404 of FIG. 4, where these requests are depicted.) Similarly, linked list 820 represents service ID "Svc_B", and indicates that requests having correlators "B2" and "B6" had this service ID. Linked lists 830-840 represent a single execution corresponding to each of the service IDs "Svc_C" and "Svc_D".

In Block 340, another linked list is created for each of the unique service IDs, this time comprising the set of parameter information used for each request execution that is associated with this service ID. Sample parameter information is illustrated in column 450 of the data in FIG. 4, and linked lists 910-940 resulting from this sample data are depicted at 900 of FIG. 9.

Block 345 initializes a "marker" (which, in preferred embodiments, is implemented as a numeric counter) that is associated with each parameter. Preferably, the markers are initialized to zero. (Note that FIG. 3 refers to these markers as "fields". This is for purposes of illustration. The specific manner in which a marker is associated with a parameter is not material to the inventive techniques of the present invention.)

Block 350 attempts to programmatically determine which parameter values influence whether certain requests hit wait points. In preferred embodiments, this comprises analyzing each wait point set, and finding the differences in parameter values across the sets of parameters used on each service associated with that wait point set. Referring to the sample wait point set linked lists 700 in FIG. 7, it can be seen that the wait point set having WP set ID WPS1 is associated with correlators A1 and A4 (see reference number 710). Both of these correlators, in this example, represent service ID Svc_A as shown in rows 401 and 404 of FIG. 4. The sample parameter information for the first execution of Svc_A is shown in column 450 of row 401, and comprises a first parameter named "p1" that has value 1 and a second parameter "p2" that has value 2. The second execution of Svc_A also uses these same parameters, and in this example, the parameters have values 1 and 102. Block 350 therefore compares these parameter sets, and determines (from the available sample data) that executions of Svc_A encounter the wait points in wait point set WPS1 when their first parameter, p1, is set to 1 and when their second parameter, p2, is set to either 2 or 102. Preferred embodiments therefore presume that having parameter p1 set to 1 may be significant in causing executions of Svc_A to encounter these wait points; however, variations in the value of parameter p2 may potentially be insignificant (i.e., p2 is presumed to be a non-discriminator). Accordingly, the differencing operation in Block 350 "subtracts" the parameter p2 information, leaving parameter p1. If the linked list 710 for WPS1 identified any other service IDs, then Block 350 would also perform a service-ID-specific comparison (i.e., a differencing operation performed for requests having a specific service ID) within the parameter sets of each of those service IDs. For example, if linked list WPS2 720 contained more than one correlator referencing service ID Svc_B and/or Svc_D, then differencing would be carried out for their respective parameter sets. (Note that Block 350 does not compare parameter sets from one service ID to another, in preferred embodiments.)

In Block 355, the marker for each parameter that remains after the differencing operation in Block 350 is set to one. Those parameters having their marker set to one at this point are therefore those that appear to be significant in determining whether some set of wait points is reached, while those having their markers set to zero are those that appear to be non-discriminators.

Next, Block 360 performs a differencing operation that attempts to further refine the determination of which parameter information should be used when constructing the recognizers. In this case, the differencing operation looks for parameter information that does not distinguish which wait point sets are encountered, for a particular service ID. Each service ID is analyzed, for all wait point sets associated with a request of that service ID. Referring to linked list 820 in FIG. 8, it can be seen that correlators B2 and B6 are associated with service ID Svc_B. Referring also to FIG. 7, these correlators were used by requests encountering the wait point sets having WP set ID WPS2 (see reference number 720) and WPS4 (see reference number 740). The sample parameter information for the first execution of Svc_B is shown in column 450 of row 402, and comprises a first parameter named "p3" that has value "A" and a second parameter "p4" that has value "B". The second execution of Svc_B also uses these same parameters, and in this example, the parameters have values "X" and "B". See row 406. Block 360 therefore compares these parameter sets (and would also compare parameter sets of any additional wait point sets with which Svc_B is associated). From the available sample data, this comparison determines that a value of "B" for parameter "p4" occurs in both wait point sets, but the value for parameter "p3" is different from one wait point set to the other. Preferred embodiments therefore presume that having parameter p4 set to "B" is a non-discriminator. That is, this value is apparently not significant in determining which wait points are encountered by executions of Svc_B. Accordingly, the differencing operation in Block 360 "subtracts" the parameter p4 information, leaving parameter p3.

Block 365 sets the marker associated with each parameter subtracted out, or "differenced out", by Block 360 to zero. Thus, in the example for Svc_B, the marker associated with p4 (a non-discriminator) is set to zero. Block 370 then increments the marker for those parameters that remained after the differencing operation of Block 360. That is, Block 370 is concerned with the parameters which have different values in the different wait point sets. In the example for Svc_B, the marker associated with p3 (which appears to be a discriminator) is therefore incremented.

Upon completion of the analysis operations of FIG. 3, those parameters having their markers set to two are those which preferred embodiments have determined are the highest-probability differentiators/discriminators.

Embodiments of the present invention may be adapted for performing additional or different types of differencing operations, without deviating from the scope of the present invention. For example, referring to the discussion of service ID Svc_A, above, it was determined that parameter p2 was a non-discriminator, because requests of this service type encountered the wait points in wait point set WPS1 for different values of parameter p2. Across a large enough sample, it might be determined that (for example) 2 and 102 are the only encountered values of this parameter. In that example, parameter p2 might be retained as a discriminator, using two potential values instead of one when creating a recognizer (as discussed below with reference to Block 1030 of FIG. 10). As another example, embodiments of the present invention may further consider the number of different wait point sets (and/or the makeup of those wait point sets) that are crossed by a particular parameter value before deciding that it is a non-discriminator. That is, suppose requests having service ID Svc_A (which have two parameters, p1 and p2, according to the sample data in FIG. 4) are found to encounter ten different wait point sets. If parameter p1 has the value 1 for five of these wait point sets, then p1 is more likely to be a non-discriminator than if this value is found in nine of the wait point sets.

Figure 10:
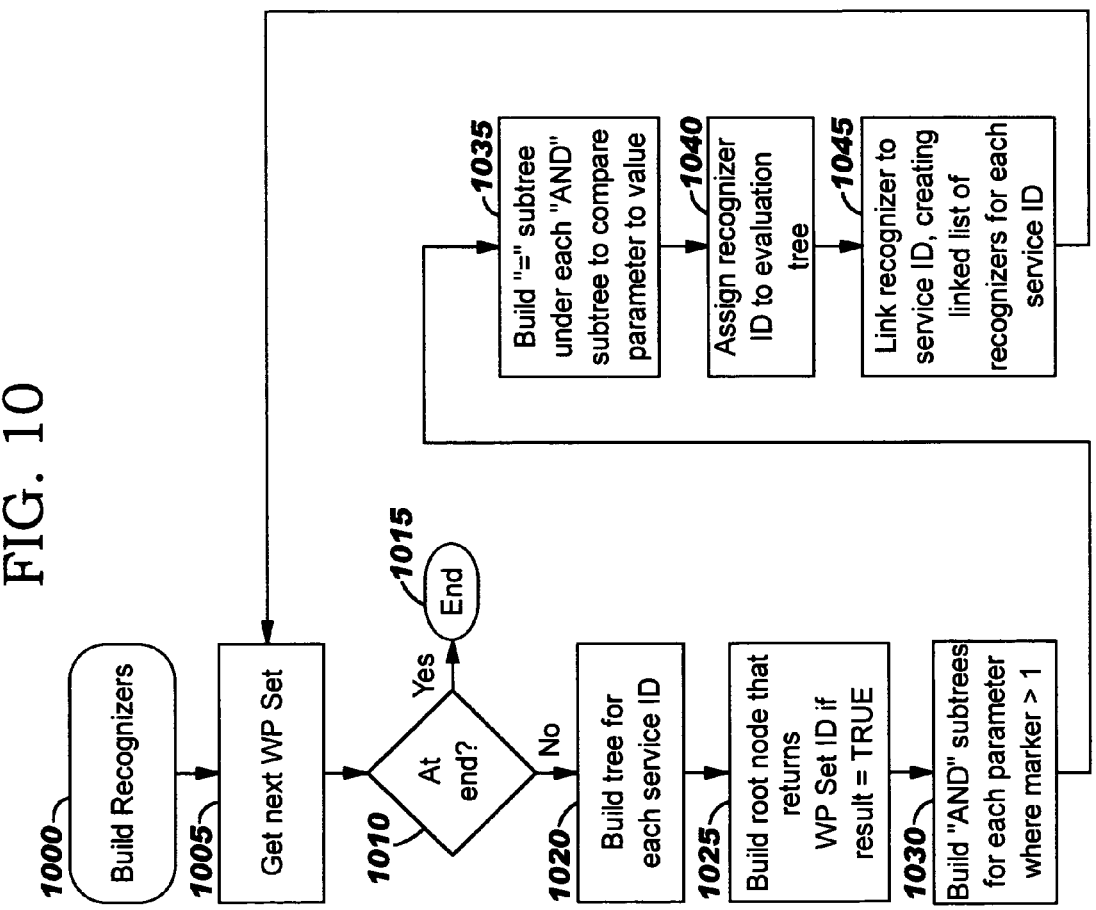

FIG. 10 provides a flowchart depicting how embodiments of the present invention may autonomically and dynamically construct recognizers, using results of the analysis performed according to FIG. 3. In preferred embodiments, operation of FIG. 10 builds a finite automata-style mechanism to interpret the parameter information for an incoming request as quickly as possible when new requests enter the system. (Note that the request's parameters are available at some point just before the dispatch of the request, and the recognizers built according to FIG. 10 analyze those parameters. This parameter analysis operation is performed at Block 215 of FIG. 2, which has been discussed above.) The finite automata-style mechanism is referred to hereinafter as an "evaluation tree". Evaluation trees are known in the art, and are used to perform analysis of information and return a result. Typically, the result to be returned is specified in the root node of the evaluation tree. In preferred embodiments, the result to be returned is the identifier of a wait point set. These evaluation trees are used by preferred embodiments for recognizing characteristics of incoming requests, and thus the term "recognizer" is also used herein to refer to an evaluation tree. (Use of evaluation trees for embodying dynamically- and autonomically-built recognizers as disclosed herein is not known in the art.)

The processing of FIG. 10 (at Block 1000) may be invoked in a timer-driven manner or an event-driven manner, and configuration data may be used in some implementations to trigger this invocation (e.g., at a configured interval, or perhaps when average response time or average wait time exceeds a configured threshold).

Figure 13:
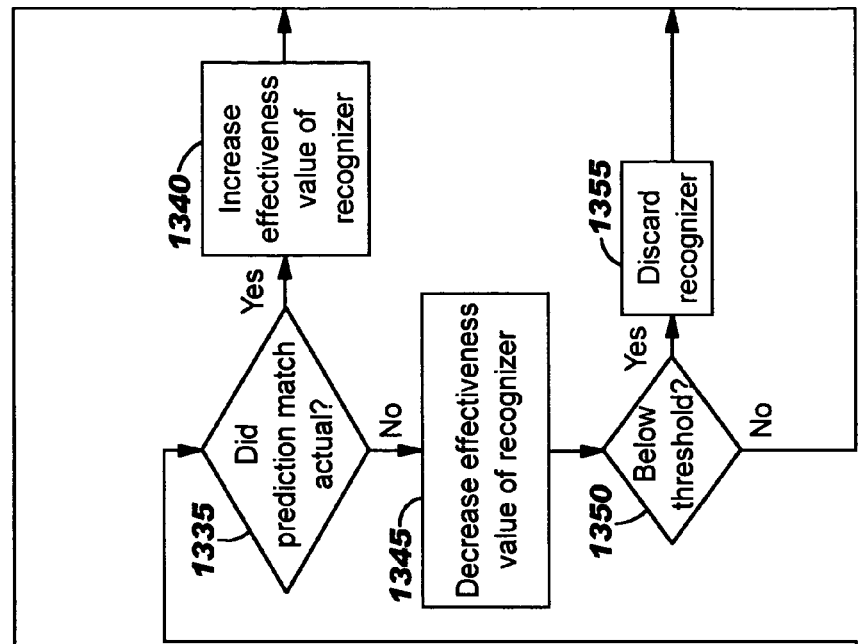

In preferred embodiments, the dynamically- and autonomically-created recognizers are created anew for their environment when an implementation of the present invention operates, based on the environment's current workload. Preferred embodiments are also adapted for ceasing to use a particular recognizer that, based on execution data that is generated as requests are executed, ceases to be useful—for example, if the characteristics of the system's workload change over time. In this case, those recognizers which are no longer useful are preferably garbage-collected (or otherwise removed from operation). Preferred embodiments therefore perform a feedback analysis as to the effectiveness of the currently-active recognizers. A flowchart depicting a feedback analysis routine that may be used for this purpose is shown in FIG. 13, and is discussed below.

In alternative embodiments (not illustrated by FIG. 10), it may be desirable to persist the recognizers (or perhaps some subset thereof) to longer-term storage and then retrieve the recognizers from storage, rather than creating them anew. The persisting of a recognizer might be performed when it appears that this particular recognizer is not currently useful. For example, the system's workload may be changing, and it may happen that the recognizer might be useful if the workload changes back again at a later time. It should be noted, however, that the work to build a recognizer may be negligible compared to the overhead of persisting the recognizer and/or the work required to determine whether a persisted recognizer should become active again in view of current system behavioral characteristics.

Turning now to the details of processing used by preferred embodiments, as shown in FIG. 10, each wait point set is evaluated, in turn, to construct one or more recognizers that can programmatically detect incoming requests which are likely to encounter the wait points of this wait point set. Block 1005 therefore obtains the next wait point set identifier. (Preferably, a linked list of all wait point set identifiers is created from the result of executing FIG. 3. For example, a linked list may be created which has, as its elements, the WP set IDs WPS1, . . . WPS4, which are illustrated in FIG. 6.) Block 1010 checks to see if all wait point set identifiers have now been processed, and if so, processing exits from FIG. 10 at Block 1015. Otherwise, processing continues at Block 1020.

Block 1020 indicates that an evaluation tree will be built for each service ID associated with this wait point set, and therefore initializes an evaluation tree for each service ID associated with this wait point set. In Block 1025, logic is generated for the root node that will return the WP set ID of this wait point set if evaluation of the tree's nodes returns TRUE. Referring to FIGS. 7 and 8, for example, one service-ID-specific evaluation tree will be constructed to evaluate requests for Svc_A to determine if they may encounter the wait points in WPS1, and two evaluation trees will be constructed to evaluate whether requests of the corresponding type may encounter the wait points in WPS2 (i.e., one evaluation tree for Svc_B and one for Svc_D).

Blocks 1030-1045 iterate for each evaluation tree to be built (although this iteration has not been depicted in FIG. 10, for drafting convenience; it will be obvious how iterative logic can be added to FIG. 10). Block 1030 builds "AND" subtrees for each parameter having a value greater than one for its associated marker. (The AND subtree may be omitted if there is only one such parameter for a particular service ID; or, a default TRUE node may be generated as the second child node of the AND subtree in this case. See the discussion of subtree 1115 of FIG. 11, below.) Block 1035 then builds an "=" (i.e., equality comparison) subtree under each AND subtree (or under the root node, if the AND subtree has been omitted), where the child nodes of this "=" subtree are (1) the name of the parameter whose marker is greater than one (as determined in Block 1030) and (2) the value of that parameter.

Block 1040 assigns a recognizer ID to the evaluation tree just constructed. Block 1045 links this recognizer to the service ID represented therein, thereby creating, for each service ID, a linked list (or similar structure) of the recognizers that can be used at run time for incoming requests that have a matching service ID. Thus, with reference to the sample data described herein, the linked list for Svc_B would contain elements identifying the recognizers for WPS2 and WPS4. Optionally, the recognizers may be ordered within their linked list. For example, it may be preferable to put recognizers having the highest number of parameters at the head of their respective list, as these recognizers may tend to be better predictors (e.g., due to having more parameters). Control then returns to Block 1005 to begin processing the next wait point set identifier.

Note that when none of the markers associated with parameters for a particular service ID have values greater than one, Blocks 1030 and 1035 preferably omit building any subtrees in the evaluation tree under construction. In this case, the evaluation tree comprises only a root node that returns the wait point set ID. If the linked list of evaluation trees for that service ID has more than one element, then it may be desirable to move the evaluation tree having only a root node to the end of the linked list (as it would otherwise prevent evaluation of all of the other evaluation trees).

Figure 11:
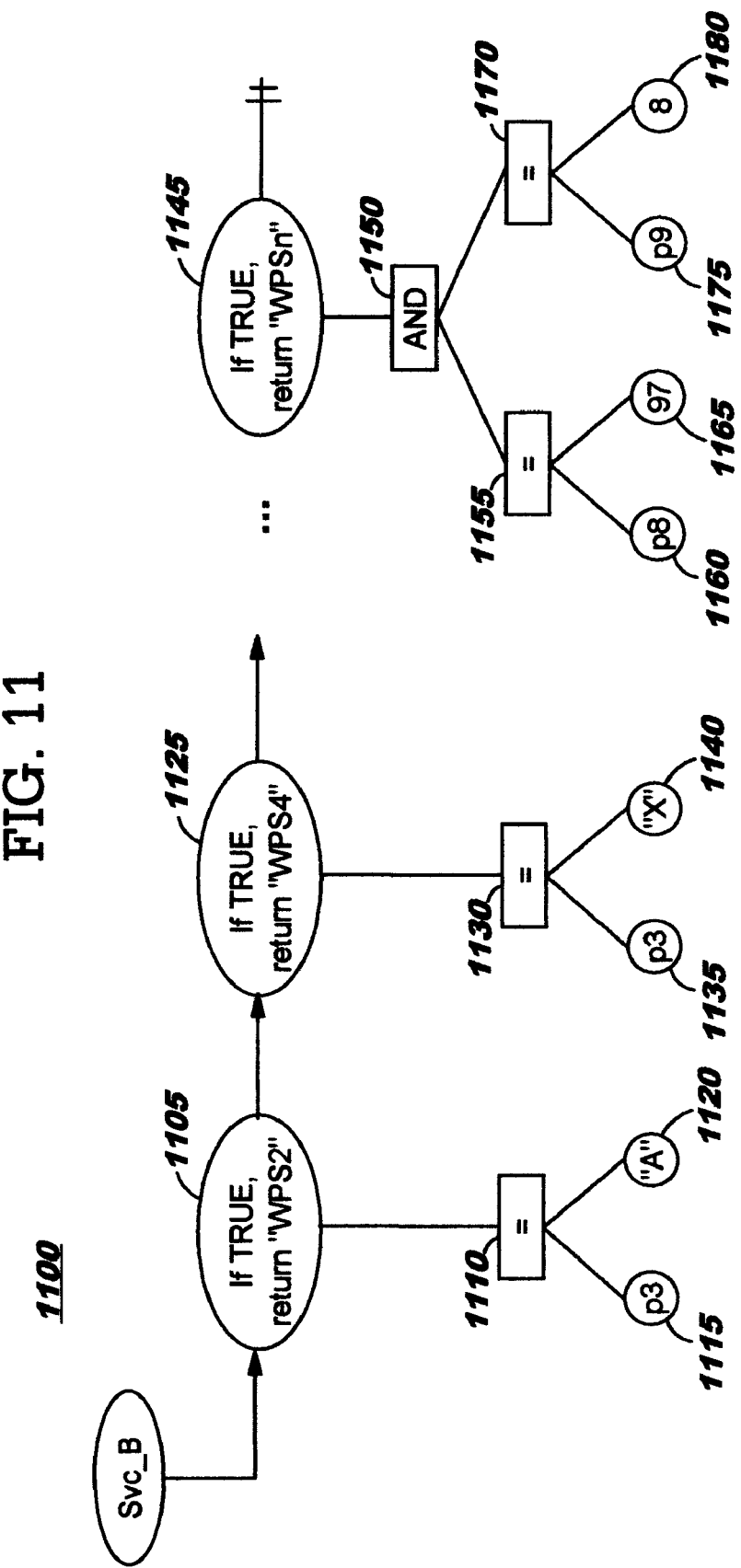
FIG. 11 provides an abstract representation of sample evaluation trees to illustrate operation of the logic in FIG. 10.

FIG. 11 shows, conceptually, how a linked list 1100 of evaluation trees for service ID "Svc_B" might be constructed. Referring back to reference numbers 720 and 740 FIG. 7 (as well as reference number 820 of FIG. 8), it can be seen that requests for this service ID encountered wait point sets WPS2 and WPS4. Thus, as show in FIG. 11, linked list 1100 has an entry 1105, 1125 for evaluation trees created for each of these wait point sets. As shown in the first evaluation tree having root node 1105, this root node 1105 returns the wait point set identifier "WPS2" if its subtrees evaluate to TRUE. Similarly, the evaluation tree having root node 1125 returns the wait point set identifier "WPS4" if its subtrees evaluate to TRUE. Linked list 1100 also contains another evaluation tree 1145, in this example, having wait point set ID "WPSn", to indicate that a particular linked list of evaluation trees may contain many entries.

Also note that FIG. 11 shows the trees 1105, 1125, 1145 themselves as elements of the linked list. In actual practice, it may be preferable to store a pointer to each tree as the linked list element, as has been discussed above with reference to Block 1045. (While the discussion of Block 1045 referred to optionally ordering the linked list entries by descending number of parameters, the example linked list 1100 is shown in order of wait point set ID, for purposes of illustration.)

The "=" node 1110 in FIG. 11 is generated by Block 1035 of FIG. 10, comparing (for this example) the parameter named "p3" with the value "A", as shown at nodes 1115 and 1120. The "=" node 1130, on the other hand, compares this same parameter p3 with the value "X". See nodes 1135 and 1140. Thus, it is presumed for purposes of the example in FIG. 11 that the analysis performed according to FIG. 3 indicated that p3 was a discriminator for each wait point set WPS2 and WPS4, although different parameter values were significant to each wait point set, while parameter "p4" (see reference number 920 in FIG. 9) was not found to be a discriminator for this service ID. Accordingly, parameter p3 is presumed, for purposes of FIG. 11, to have a marker value greater than one. Note that the AND subtree discussed with reference to Block 1030 has been omitted in trees 1105 and 1125, as an optimization, since there is only one "=" subtree in each. (The logic of Block 1030 continues to be responsible for selecting only those parameters having markers greater than one when this optimization is used; alternatively, that determination may be incorporated within the logic represented by Block 1035.) The "=" node 1110 is built by Block 1035, and the child nodes 1115 and 1120 indicate that the processing of FIG. 3 determined that (p3="A") is a discriminator for service ID Svc_B within the wait point set WPS2. (When the optimization for Block 1030 is not implemented, then a default TRUE node, not shown, may be generated as a sibling of "=" node 1110, and a parent AND node for those siblings would then appear as the only child node of root node 1105, in this case.)

Evaluation tree 1145 illustrates a more complex evaluation, where two different parameters have been found to be discriminators for the wait point set having ID "WPSn". Accordingly, Block 1035 generates an "=" subtree 1155, 1170 for evaluating each parameter, and Block 1130 generates an AND node 1150 for combining the results of each "=" subtree. In this example, the subtrees 1155, 1170 compare parameters "p8" to the value "97" and "p9" to the value "8", respectively (where these parameters and values do not correspond to the sample data that has been discussed earlier).

This linked list 1100 is then used at run time, according to preferred embodiments, to compare the parameter information from an incoming request against the dynamically-determined discriminators. Thus, suppose a request arrives that has a service ID matching Svc_B. The linked list of recognizers for Svc_B (created according to Block 1045) is consulted, and the list 1100 of recognizers shown in FIG. 11 is therefore identified as being applicable to this request. Evaluating the request's parameters using recognizer 1105 (i.e., when executing the logic of FIG. 12, which is invoked from Block 215 of FIG. 2) comprises determining whether this request has a parameter p3 whose value is set to "A". If so, then "=" node 1110 returns TRUE and root node 1105 returns "WPS2". (It may be preferable to always use numeric values for WP set IDs; alphanumeric values are used herein for ease of illustration.) On the other hand, if the request being evaluated does not have a value of "A" for parameter p3, then the next recognizer linked to this service ID is evaluated, which in the example of FIG. 11 is recognizer 1125. If the request has a value of "X" for parameter p3, then tree 1125 returns "WPS4" as the matching recognizer, and execution of the recognizers (for purposes of Block 215 of FIG. 2) ends; otherwise, each successive recognizer in linked list 1100 is preferably executed until reaching the end of the list or encountering a recognizer that returns TRUE. Processing of the recognizers is discussed in more detail below with reference to FIG. 12.

In alternative embodiments, the evaluation subtrees may contain "OR" nodes (or analogous processing) in addition to, or instead of, "AND" nodes. For example, it may happen in these alternative embodiments that a set of values (rather than a single value) is determined to be a valid discriminator for a particular parameter. This was discussed above, with reference to the values 2 and 102 for parameter p2 of service ID Svc_A (assuming a larger set of sample data, and alternative differencing operations used in FIG. 3, as discussed earlier). Thus, Blocks 1030-1035 may further comprise building nodes for handling OR cases. A child node such as node 1165 might therefore be replaced, in an alternative embodiment, with a node listing a set of parameter values; or, a subtree might be added that has an "OR" node and has two (or potentially more than two) child nodes, one for each of the parameter values.

Turning now to FIG. 12, logic is depicted for executing the recognizers which have been constructed according to FIG. 10. This logic (see Block 1200) is invoked from Block 215 of FIG. 2, when a new incoming request has been received. Block 1205 uses the service ID (obtained by Block 210 of FIG. 2) to get the list of available recognizers that can be used to analyze the incoming request. For example, the linked list 1100 of recognizers 1105, 1125, 1145 shown in FIG. 11 may be obtained when the incoming request has service ID Svc_B. Block 1210 then executes one or more of these recognizers, as appropriate, until (1) a recognizer returns its wait point set ID or (2) there are no more available recognizers for this service ID. Control then reaches Block 1215, which returns the WP set ID (or a special value, such as "−1", if all of the recognizers were executed without any of them returning their WP set ID). Preferred embodiments also return the ID of the matching recognizer. (This recognizer ID is then used at Block 235 of FIG. 2 when creating data that may be used when performing feedback analysis, as described below with reference to FIG. 13.)

It may happen that, for some service IDs, there are no available recognizers. This may be the case, for example, when a particular request type first appears in a system's workload. Blocks 1210 and 1215 then return a special or default value for the matching WP set ID (as has also been discussed with reference to Blocks 220-230 of FIG. 2).

FIG. 13 illustrates a feedback mechanism with which effectiveness of the currently-active recognizers can be measured. This logic 1300 is preferably invoked periodically, for example using a configurable interval or using an event such as average wait time per request (or perhaps for selected time-critical requests) exceeding a threshold value. (It is expected that recognizers will be more effective when they are created in view of a relatively large amount of recently-captured execution history data.)

In preferred embodiments, this feedback operation is performed using execution history from a plurality of previously-executed requests. In one aspect, execution history information for all request executions which have occurred since a prior iteration of FIG. 13 is processed. In another aspect, execution history for a subset of those executions (including a randomly-selected subset) may be processed. FIG. 13 represents the approach where execution history for all request executions is processed, and thus Block 1305 obtains the next available correlator. For example, the logic of Blocks 305-310 may be repeated, using the tuples which have been recorded according to Block 245 of FIG. 2, to determine the correlators for which execution history information is available. In this case, Block 1305 comprises obtaining the next correlator from this sorted information. Block 1310 then tests whether there were any more correlators to process. If not, then the processing of FIG. 13 exits (Block 1315). Otherwise, processing continues at Block 1320.

Block 1320 then obtains (e.g., from the sorted tuples) the set of wait points IDs that represents the wait points actually encountered by the request that corresponds to the correlator being processed. (As discussed above with reference to Block 315, the duplicated wait point IDs may be removed efficiently after the tuples have been sorted.)

Block 1325 consults the data stored at Block 235 of FIG. 2 for this request, using the current correlator as an index or key for retrieval. From that stored data, the wait point set ID and recognizer ID are retrieved. The wait point set ID indicates the wait points that the recognizer (which is associated with the retrieved recognizer ID) predicted would be encountered by the executing request.

In Block 1330, the set of actual wait point IDs obtained in Block 1320 is compared to the wait points in the predicted wait point set (using the WP Set ID retrieved in Block 1325 to obtain the corresponding linked list; see, for example, the linked lists at 600 in FIG. 6). Block 1335 tests to see whether the prediction was accurate. If so, then Block 1340 increases the effectiveness value of the recognizer identified by the recognizer ID retrieved at Block 1325. (This effectiveness value may be stored as an integer value that is incremented or decremented, based on the outcome of Block 1335, for example.)

If the test in Block 1335 has a negative result (i.e., the predicted set of wait points was not accurate), then Block 1345 decreases the effectiveness value of the recognizer that made this prediction. Block 1350 then tests to see whether the resulting effectiveness value is below a predetermined threshold (which may be a configurable value). If so, this is an indication that the associated recognizer is not considered effective enough for continued use, and Block 1355 therefore discards the recognizer. (As discussed earlier, in alternative embodiments, the recognizer might be persisted to some type of storage for potential use when the system's workload changes.) If the test in Block 1350 has a negative result, on the other hand, then preferred embodiments will continue using this recognizer.

After a negative result at Block 1350, or after the processing of Block 1340 or Block 1355, control returns to Block 1305 to begin evaluating the execution history for another request and using that information to increment or decrement the effectiveness of a recognizer.

In an alternative approach, the processing of FIG. 13 may be adapted for remembering which recognizers are evaluated in each iteration, such that each invocation of the logic of FIG. 13 performs the effectiveness comparison in Blocks 1330-1355 only once per recognizer.

As has been demonstrated, the present invention provides advantageous techniques for classifying requests in a dynamically-changeable workload and programmatically distributing the workload across a set of execution resources (e.g., a set of logical thread pools) based on the classification. Overall performance of a multithreaded server may thereby be improved, and end users may benefit by reduced response time for many of their requests. The disclosed techniques may be used advantageously in application servers, message-processing software, and so forth. Furthermore, the disclosed techniques may be used advantageously with a variety of incoming workload types, and while preferred embodiments have been described, techniques disclosed herein may be adapted in other ways without deviating from the scope of the present invention. A number of such alternatives will now be described.

Optionally, other factors may be used when classifying requests, in addition to (or instead of) parameter information. For example, a request's execution context may be used, where this information may include (in addition to parameter information) one or more of the following: a user identifier ("user ID") from which this work request was received; a user group of which this user is a member; a location where the request came from (such as the Internet Protocol, or "IP", address of the user); the request type (or, alternatively, other information such as a class and method name); other contextual attributes of the request; or some combination of these attributes. In general, the execution context of the request may include most any piece of contextual data that might be associated with the request, either directly or indirectly, and therefore these attributes are presented by way of illustration but not of limitation. References above to recording parameter information, and analyzing parameter information, for requests in a workload may therefore be adapted to record and analyze additional/alternative information.

The classification process may also take into account the priority of requests, for example in terms of priority specified in a service level agreement, as well as the historical behavior of requests. Similarly, other types of "importance" factors may be used when scheduling requests, in addition to predictions regarding wait points and resource contention, such as an importance level that may be associated with individual users or user groups. If two types of requests are predicted to wait on database access, for example, embodiments of the present invention may be adapted for giving preferential treatment to one or the other of the request types, based on this type of importance factor.

The manner in which requests may be vectored among thread pools may be varied, and may be determined statically or dynamically. For example, when a lookup table is used that associates predicted wait point sets with thread pools, the mapping stored therein may be built manually, or using some type of programmatic tool, or this mapping may be programmatically revised in view of changing workload characteristics.

The present invention may be provided as method(s) of doing business. For example, a service may be offered to customers whereby operational characteristics of their client/server network traffic are monitored, and these observations may be used to make predictions about subsequent behavior in the application server(s). Preferably, the observations are directed toward analyzing the interactions between wait points encountered by units of work and the parameter information and/or other execution context of those units of work. The techniques that have been described herein may be used when implementing software for carrying out this service. This service may be provided under various revenue models, such as pay-per-use billing, monthly or other periodic billing, and so forth.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may be embodied in a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored on one or more computer-readable media, where each such media can direct a computer or other programmable data processing apparatus to function in a particular manner, such that the instructions stored in the computer-readable media produce an article of manufacture including instruction means which implement the function specified in the flowchart and/or block diagram block or blocks.

The computer program instructions may also be loaded onto one or more computers or other programmable data processing apparatus to cause a series of operational steps to be performed on the computers or other programmable apparatus to produce, on each such device, a computer implemented process such that the instructions which execute on the device provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A computer program product for programmatically analyzing execution behavior of work units, the computer program product comprising at least one computer-usable storage media having computer-usable program code embodied therein for:
   recording, for each of a plurality of work units, information regarding each of at least one instrumented wait point encountered in code executed by that one of the work units;
   determining, for each of the plurality of work units from the recorded information, a set comprising the wait points encountered by that one of the work units;
   determining all unique ones of the determined sets of wait points;
   determining characteristics of the work units that encountered the wait points in each of the unique ones of the wait point sets;
   using the determined characteristics to programmatically build one or more recognizers which are adapted to recognizing those characteristics in arriving work units that are to be subsequently executed;
   executing the recognizers to programmatically recognize the characteristics in the arriving work units; and
   using the programmatically-recognized characteristics when allocating execution resources to the arriving work units.

2. The computer program product according to claim 1, wherein the allocated execution resources are threads in thread pools.

3. The computer program product according to claim 1, wherein the work units are execution requests.

4. The computer program product according to claim 1, wherein the recorded information further comprises time spent waiting at each encountered wait point.

5. A method of programmatically analyzing execution behavior of work units using computer-readable code executed by a computer, comprising:
   recording, for each of a plurality of work units, information regarding each of at least one instrumented wait point encountered in code executed by that one of the work units;
   determining, for each of the plurality of work units from the recorded information, a set comprising the wait points encountered by that one of the work units;
   determining all unique ones of the determined sets of wait points;
   determining characteristics of the work units that encountered the wait points in each of the unique ones of the wait point sets;
   using the determined characteristics to programmatically build one or more recognizers which are adapted to recognizing those characteristics in arriving work units that are to be subsequently executed; and
   using the programmatically-built recognizers when allocating execution resources to the arriving work units.

6. The method according to claim 5, wherein the work units are execution requests.

7. The method according to claim 6, wherein the execution requests are content requests.

8. The method according to claim 6, wherein the execution requests are Web services requests.

9. The method according to claim 6, wherein the execution requests specify method/class names to be executed.

10. The method according to claim 5, wherein the recorded information comprises an identifier of each encountered wait point.

11. The method according to claim 10, wherein the recorded information further comprises time spent waiting at each encountered wait point.

12. The method according to claim 5, wherein the characteristics comprise parameter names and values thereof.

13. The method according to claim 5, wherein determining the characteristics further comprises evaluating occurrence of the characteristics among the unique ones of the wait point sets.

14. The method according to claim 5, wherein determining the characteristics further comprises determining which of the characteristics are discriminators as to the wait points that are encountered.

15. The method according to claim 5, wherein using the programmatically-built recognizers further comprises executing the recognizers to recognize the characteristics in the arriving work units in order to allocate the execution resources to the arriving work units.

16. The method according to claim 5, wherein using the programmatically-built recognizers further comprises classifying the arriving work units using the recognizers.

17. The method according to claim 5, wherein the allocated execution resources are threads in thread pools.

18. The method according to claim 5, further comprising programmatically evaluating effectiveness of one or more of the recognizers, in view of its ability to predict which of the instrumented wait points will be encountered in code executed by the arriving work units.

19. The method according to claim 18, further comprising programmatically destroying ones of the programmatically-evaluated recognizers for which the effectiveness falls below a threshold value.

20. A system for programmatically analyzing execution behavior of work units, comprising:
a computer comprising at least one processor; and
instructions which execute using at least one of the at least one processor to implement functions comprising:
recording, for each of a plurality of work units, information regarding at each of least one instrumented wait point encountered in code executed by that one of the work units;
determining, for each of the plurality of work units from the recorded information, a set comprising the wait points encountered by that one of the work units;
determining all unique ones of the determined sets of wait points;
determining characteristics of the work units that encountered the wait points in each of the unique ones of the wait point sets;
using the determined characteristics to programmatically build one or more recognizers which are adapted to recognizing those characteristics in arriving work units that are to be subsequently executed;
executing the recognizers to programmatically recognize the characteristics in the arriving work units; and
using the programmatically-recognized characteristics when allocating execution resources to the arriving work units.

21. The system according to claim 20, wherein the allocated execution resources are threads in thread pools.

22. The system according to claim 20, wherein the work units are execution requests.

23. The system according to claim 20, wherein the recorded information further comprises time spent waiting at each encountered wait point.

24. A method of analyzing execution information for work units using computer-readable code executed by a computer, comprising:
determining, from information that has been recorded for each of a plurality of work units, a set comprising each of at least one instrumented wait point encountered in code executed by that one of the work units;
determining all unique ones of the determined sets of wait points;
determining characteristics of the work units that encountered the wait points in each of the unique ones of the wait point sets;
determining which of the characteristics are discriminators as to the wait points that are encountered in each of the unique ones of the wait point sets;
programmatically building one or more recognizers which are adapted to recognizing, in arriving work units that are to be executed, the characteristics which are determined to be discriminators;
executing the recognizers to recognize, in the arriving work units, the characteristics which are determined to be discriminators; and
allocating execution resources to each of the arriving work units according to which of the recognizers recognizes, for that one of the arriving work units, the characteristics which are determined to be discriminators.

25. The method according to claim 24, wherein the recorded information further comprises time spent waiting at each encountered wait point.

26. The method according to claim 24, wherein the work units are execution requests.

27. The method according to claim 24, wherein the allocated execution resources are threads in thread pools.

* * * * *